United States Patent
Sato

[15] 3,678,823
[45] July 25, 1972

[54] ELECTRONIC SHUTTER FOR THROUGH-THE-LENS CAMERA HAVING INTERCHANGEABLE LENSES OF DIFFERING APERTURE

[72] Inventor: Takayoshi Sato, Tokyo, Japan
[73] Assignee: Kabushikikaisha Copal, Tokyo, Japan
[22] Filed: Nov. 5, 1970
[21] Appl. No.: 87,148

[30] Foreign Application Priority Data
Nov. 14, 1969 Japan..................................44/91711

[52] U.S. Cl................................95/10 CT, 95/10 CE, 95/42, 95/53 EB
[51] Int. Cl...................................G03b 7/08, G03b 9/62
[58] Field of Search............95/10 CE, 10 CT, 53 E, 53 EB, 95/42

[56] References Cited

UNITED STATES PATENTS 3,470,798  10/1969  Miyakawa............................95/10 CT
3,163,097  12/1964  Zenyoji et al..........................95/42 X
3,532,036  10/1970  Nakamura............................95/42 X
3,485,153  12/1969  Ono et al. ............................95/42 X

*Primary Examiner*—Joseph F. Peters, Jr.
*Attorney*—Kelman and Berman

[57] ABSTRACT

An electronically controlled shutter for a through-the-lens camera which is designed for use with interchangeable lenses of differing maximum aperture. The shutter includes an integrating circuit having a light sensitive device and a capacitor, connected to the base of a transistor, which is gated on for a reference time interval proportional to the intensity of received light. To compensate for lenses having a different maximum aperture, the circuit includes a resistor having a sliding tap, connected to the emitter of the transistor, and which is physically moved by a pin on the interchangeable lens. Thus, the bias on the transistor is altered to compensate for the different exposure calculation required by each lens.

6 Claims, 6 Drawing Figures

ELECTRONIC SHUTTER FOR THROUGH-THE-LENS CAMERA HAVING INTERCHANGEABLE LENSES OF DIFFERING APERTURE

BACKGROUND OF THE INVENTION

The present invention relates to apparatus for measuring the intensity of light received from an object to be photographed through either a fully or partially opened diaphragm of an interchangeable lens selectively mounted on a camera.

The invention is particularly useful when used with an electronically shutter of the type disclosed in my co-pending U.S. Pat. Application Serial No. 63,214, filed Aug. 12, 1970, although the invention may be advantageously used with electronically controlled shutter.

An electronically controlled shutter of the type described above operates as follows. During initial operation of the shutter release of the camera, light from the object to be photographed is received, through the objective lens of the camera, by a photoelectric element such as a photoconductive element or a photovoltaic element connected in an integrating circuit having transistors and a capacitor connected in series to the photoelectric element such that a reference time interval is established in the integrating circuit in accordance with the intensity of light received by the photoelectric element and the time constant of the circuit as dictated by the capacitor and the photoelectric element. During this reference time interval a second photoelectric element in the camera receives light from the object directly without passing through the objective lens so that a memory circuit connected to the integrating circuit and including the above second photoelectric element, a transistor and a second capacitor is actuated so as to electrically charge or discharge (the second capacitor through the above second photoelectric element thereby establishing a reference voltage in the memory circuit in accordance with the above reference time interval and the intensity of light received by the second photoelectric element. As the operation of shutter release proceeds the shutter blade is opened, while an exposure control circuit connected to the memory circuit and having a third photoelectric element, a transistor and a third capacitor is actuated so as to electrically charge (or discharge) the third capacitor through the third photoelectric element which also receives light from the object to be photographed directly without passing through the objective lens. The voltage appearing across the third capacitor during the actuation of the exposure control circuit is compared with the above reference voltage established in the memory circuit so as to actuate a switching circuit connected to the exposure control circuit when the voltage of the third capacitor reaches a predetermined value with respect to the above reference voltage thereby closing the shutter blade to obtain the proper exposure time regardless of any variation in the intensity of the light which may occur after the shutter blade is opened.

The second photoelectric element may double as the third photoelectric element by switching the connections thereof from the memory circuit to the exposure control circuit.

If variations in the intensity of the light received during exposure may be ignored, the second and the third photoelectric elements may be replaced by fixed variable resistors, respectively.

In such an electronically controlled shutter, information relating to the setting of the preset diaphragm regulating ring must be introduced into the electronically controlled shutter when the intensity of light received from the object is measured with a fully opened diaphragm, while the above information must not be introduced into the electronically controlled shutter when the intensity of the light is to be measured through the stopped-down diaphragm opening at which the actual exposure is effected.

In other words, assuming that the electronically controlled shutter is designed to be used with a lens having a fully opened diaphragm opening of Fo and proper exposure is obtained when the preset diaphragm regulating ring is set to F, the preset diaphragm regulating ring of a lens having a maximum aperture value F1 when mounted on the camera in place of a lens having the value Fo must be set to the apparent diaphragm opening of F' which satisfies the following relationship:

$$F' = (FoF/F_1)$$

More specifically when the electronically controlled shutter is designed for use with a lens having a fully opened diaphragm opening of F1.4, for example, and the preset diaphragm regulating ring thereof is set to F8, information such as the resistance of a variable resistor, must be introduced into the electronically controlled shutter so that the exposure time established by the electronic shutter will be 32 times the exposure time established for a fully opened diaphragm opening of F1.4. Such information can be introduced into the shutter in terms of a variation in the emitter voltage of the transistor used in the integrating circuit which includes the above-described photoelectric element receiving light from the object to be photographed through the objective lens and the capacitor connected in series therewith.

When a lens having an aperture of F2 is mounted on the camera in place of a lens having an aperture of F1.4 and the preset diaphragm regulating ring is set to F8 so that the same variation in the emitter voltage of the transistor will occur as in the case of setting the preset diaphragm regulating ring of a F1.4 lens to F8, the exposure time will be twice the proper value, because only one half of the light passing through the fully open diaphragm of the F 1.4 lens is available from the F 2 lens. The diaphragm regulating ring of the F 2 lens, therefore, must be set to F5.6 in order to obtain the proper exposure.

SUMMARY OF THE INVENTION

The object of the present invention is to provide an apparatus for correctly introducing into the electronically controlled shutter of a camera information relating to the setting of the preset diaphragm regulating ring of any of a plurality of interchangeable lenses having different apertures which may be mounted on a camera of the TTL T L type. It is further desired to obtain the proper exposure with both a fully opened diaphragm as well as with the stopped-down opening of the lens under which the actual exposure is effected.

The above object is achieved in accordance with the present invention by the provision of apparatus which differentially introduces information into the electronically controlled shutter relating to the setting of the preset diaphragm regulating ring as well as to the value of the aperture of the lens mounted on the camera. Further, the device can be switched so as to obtain the proper exposure setting through a stepped-down diaphragm through which the actual exposure is effected.

In accordance with another aspect of the present invention, the apparatus is so constructed that information relative to the value of the fully opened diaphragm is fixedly set therein so as to permit the proper exposure to be obtained when a lens having a fully open diaphragm is mounted on the camera and the preset diaphragm regulating ring is set to the fully opened diaphragm set-ting, while information relative to the setting of the preset diaphragm regulating ring is so introduced into the electronically controlled shutter that the emitter voltage of the transistor in the integrating circuit of the electronically controlled shutter is varied so as to correspond to the number os steps the preset diaphragm regulating ring has stepped through to reach the desired value in each of which steps the diaphragm opening during exposure is reduced to one half. The coupling means in the camera for varying the emitter voltage if biased so as to be normally located in a predetermined position so that it is coupled with the mating coupling means of the preset diaphragm regulating ring of any of the interchangeable lenses, insofar as the preset diaphragm regulating ring is set to the fully opened diaphragm setting when it is mounted on the camera. By this arrangement, the proper exposure is obtained with any of the interchangeable lenses having various fully opened diaphragm settings when measurements are made with a fully opened diaphragm regardless of the setting of the preset diaphragm regulating ring, because the number of steps of the preset diaphragm regulating ring steps through to reach the desired diaphragm opening, is reduced to correspond to the reduction in the value of the fully opened diaphragm in comparison with that of a lens having the greatest aperture among the available interchangeable lenses and the reduction in the number of steps the preset diaphragm regulating ring steps through is properly compensated for to achieve proper exposure by a reduction in the quantity of light passing through a lens having a smaller aperture.

On the other hand, by the above arrangement, proper exposure is achieved with lenses having reduced diaphragm openings by merely disabling the variation in the emitter voltage, because the number of steps of the diaphragm regulating ring is correspondingly reduced.

DETAILED DESCRIPTION OF THE PREFERRED EMBODIMENTS

Figure 4:
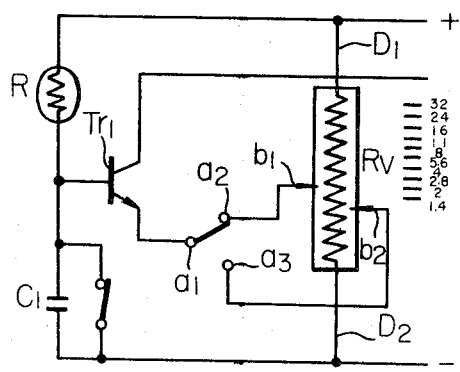
FIG. 4 is a schematic diagram showing an embodiment of the circuit of the apparatus of the present invention.

Referring to FIG. 4, and as described more fully in the above-referenced co-pending application the circuit of the electronically controlled shutter comprises an integrating circuit including a photoelectric element R such as a CdS cell receiving the light from the object to be photographed which passes through the objective lens, and a capacitor $C_1$ connected in series with the photoelectric element R and a transistor $Tr_1$ with its base connected to the junction of the photoelectric element R and the capacitor $C_1$. The opposite ends including the series circuit of the photoelectric element R and the capacitor $C_1$ are connected to the terminals of an electric source (not shown). Therefore, the capacitor $C_1$ is charged by the electric source through the photoelectric element R. Since the resistance of the photoelectric element R varies in accordance with the intensity of light received from the object, the charging rate of the capacitor $C_1$ varies in accordance with the intensity of light. One end of a resistor $R_V$ is connected to one terminal of the electric source while the other end thereof is connected to the other terminal of the electric source. The resistor $R_V$ is provided with a movable brush $b_1$ connected to a contact $a_2$ of a switch $a$ while a fixed contact $b_2$ of the resistor $R_V$ is connected to contact $a_3$ of switch $a$. The emitter of a transistor $Tr_1$ is connected to a movable contact $a_1$ of the switch $a$.

Thus, emitter bias for transistor $Tr_1$ is given by resistor $R_V$ through either of the contacts $b_1$, $b_2$ by selectively connecting the movable contact $a_1$ to contact $a_2$ or $a_3$. Thus, transistor $Tr_1$ is triggered when the voltage developed across capacitor C1 reaches the trigger voltage of transistor Tr, as determined by the emitter bias thereof. Since the charging rate of the capacitor $C_1$ varies in accordance with the intensity of light received by the photoelectric element R, the time interval from commencement of the charging of the capacitor $C_1$ until the transistor $Tr_1$ is triggered is indicative of the intensity of the light. And, when the transistor $Tr_1$ is triggered, the memory circuit (not shown) which is connected to the transistor $Tr_1$, which was activated simultaneously with the beginning of charging of the capacitor Chd 1, is deactivated so as to establish a reference voltage which is forwarded into the exposure control circuit (not shown) connected to the memory circuit so that the proper exposure is obtained as previously described.

Brush $b_1$ is used for light measurement with the fully opened diaphragm of an interchangeable lens having a preset diaphragm regulating ring, while brush $b_2$ is used for light measurement under a stopped-down diaphragm opening.

When light measurement is effected with a fully opened diaphragm, the contact $a_1$ is positioned to make contact with the contact $a_2$ and the brush $b_1$ is coupled with the preset diaphragm regulating ring of the lens mounted on the camera so that the brush $b_1$ is moved to the appropriate predetermined position of resistor $R_V$ each of which corresponds to a diaphragm opening in the series such as F1.4, F2 —— beginning at the greatest, fully opened diaphragm setting of the available interchangeable lenses when the preset diaphragm regulating ring is adjusted to the desired diaphragm opening.

At the same time, the resistor $R_V$ is so positioned that the proper exposure is achieved when the lens having the greatest aperture is mounted on the camera, and the preset diaphragm regulating ring is set to the fully opened diaphragm setting. But, when a lens having a smaller aperture is mounted, the resistor $R_V$ is shifted relative to the camera by amount corresponding to the reduction in the fully opened diaphragm setting. Thus, the emitter bias is compensated for to achieve the proper exposure regardless of the difference in the fully opened diaphragm openings of the lenses interchangeably mounted on the camera.

When light measurement is effected under a stopped-down diaphragm opening, the contact $a_1$ is switched to the contact $a_3$ so as to apply the emitter bias as determined by contact $b_2$ to the transistor $Tr_1$ through the brush $b_2$, and the resistor $R_V$ is always positioned by the coupling of the resistor $R_V$ with the lens mounted on the camera in the position at which the proper exposure is achieved by the lens of greatest aperture among the available lenses, with its diaphragm regulating ring set to the fully opened diaphragm opening. By this arrangement, the proper exposure is achieved with lenses of different full aperture regardless of the setting of the diaphragm regulating ring, because the emitter bias is varied in accordance with both the smaller aperture the fully opened diaphragm of the lens mounted on the camera and the reduction of the diaphragm opening by the operation of the diaphragm regulating ring.

Figure 1:
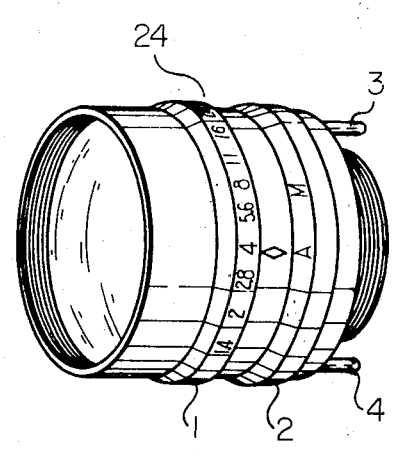
FIG. 1 is a perspective view of an interchangeable lens of the type which may be used with the present invention.
Figure 2:
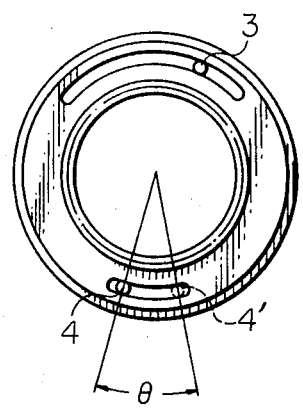
FIG. 2 is a bottom view of FIG. 1.
Figure 3:
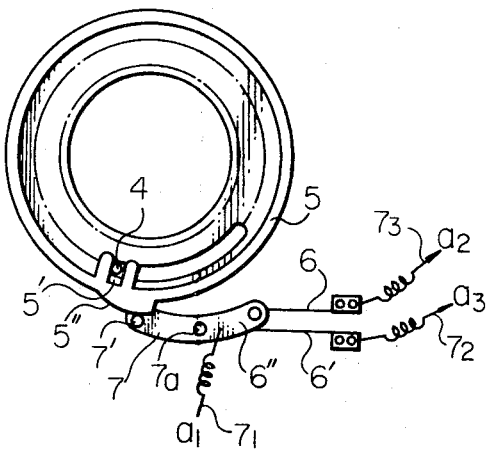
FIG. 3 is a view showing the coupling ring of the apparatus of the present invention adapted to switch the operation of the device from measurement with a fully opened diaphragm measurement with a stopped-down opening and vice versa.

FIG. 1 shows a lens suitable for use with the present invention. The objective is provided with a preset diaphragm regulating ring 1. Coupling means such as a pin 3 is coupled with the ring 1 so as to be moved therewith. A switching ring 2 is also provided in the lens and second coupling means such as a pin 4 is coupled with the ring 2 so as to be moved therewith. The ring 2 is moved between two positions one of which, positions the ring 1 as a preset diaphragm regulating ring while, the other, M (manual), establishes the ring M as a conventional diaphragm regulating device by the operation of which the diaphragm opening is directly reduced.

A camera incorporating the present invention is provided with a mating coupling ring 5 having a bifurcated portion 5' which is coupled with the pin 4 when the lens is mounted on the camera so that the ring 5 is moved correspondingly to the movement of ring 2. The ring 5 is provided with a cam 5 which engages with a pin 7' secured to one end of a lever 7 pivoted about a shaft 7a and biased by a spring 71 which also serves as a lead wire so as to urge the pin 7' toward the cam of the ring 5. A pair of contacts 6, 6' are provided adjacent to the other end of the lever 7 on which a contact pin 6" is secured so that the pin 6" selectively contacts with contact 6 or 6' when the lever 7 is swung by the cam of the ring 5 as the same is actuated.

The resistor $R_V$ is mounted on a ring (not shown) coupled with the pin 4 of the lens when the ring 2 is set to the position $A_1$ and the spring $7_1$ is connected to the contact $a_1$ while the contacts 6 and 6' are connected to the contacts $a_2$, $a_3$ through lead wires $7_3$, $7_2$, respectively.

The resistor $R_V$ is so mounted on the ring that when a lens is mounted on the camera and the ring 2 is set to the position A for measurement with a fully opened diaphragm, the resistor $R_V$ is shifted to a position corresponding to the full aperture of the lens mounted on the camera while the lever 7 is swung by the cam of the ring 5 so that the contact pin 6" engages the contact 6 thereby connecting the emitter of the transistor $Tr_1$ to the brush $b_1$.

Figure 5:
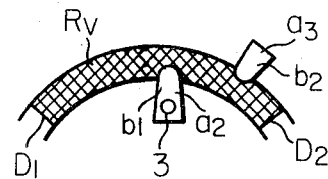
FIG. 5 is a fragmentary view showing the arrangement of the variable resistor and the brushes cooperating therewith of the apparatus of the invention.

The camera is provided with a mating coupling means (not shown) which mounts thereon the brush $b_1$. The brush $b_1$ engages pin 3 when the lens is mounted on the camera as shown in FIG. 5, so that the brush $b_1$ is moved to a predetermined position in the camera corresponding to the setting of the present diaphragm regulating ring 1.

When the ring 2 is set to the position M for light measurement with a stopped-down diaphragm, the lever 7 is swung by the cam of the ring 5 to a position in which the contact pin 6" contacts with the contact 6' so that the emitter bias is given to the transistor $Tr_1$ through the brush $b_2$ while the resistor $R_V$ is positioned at the predetermined position in the camera in which the proper exposure is achieved with the lens having the largest aperture with its diaphragm fully opened.

The operation of the apparatus shown in FIGS. 1 – 5 should be clear from the above description.

Figure 6:
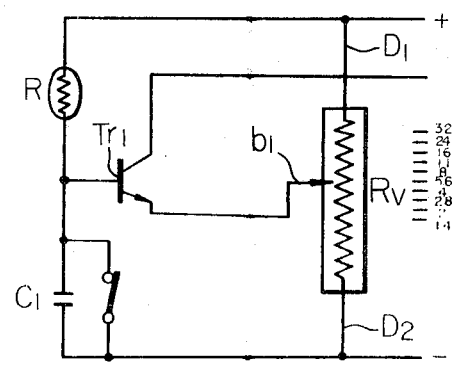
FIG. 6 is a diagram showing another embodiment of the circuit of the apparatus of the present invention.

FIG. 6 shows another embodiment of the present invention.

In this embodiment, the resistor $R_V$ is fixedly located in the camera and contact $b_2$ is omitted. Contact $b_1$ is directly connected to the emitter of the transistor $Tr_1$. The brush $b_1$ is so coupled with the pin 3 that the proper exposure is obtained when the lens having the greatest full aperture among the available interchangeable lenses is mounted on the camera and the preset diaphragm regulating ring is set to the fully opened diaphragm position. The pin 3 in any of the lenses is positioned at a predetermined position when the diaphragm regulating ring is set to its fully opened position and the mating coupling means in the camera which is adapted to engage with the pin 3 is urged to a predetermined position in the camera so that the pin 3 is snugly engaged with the mating coupling means when the lens is mounted on the camera with its diaphragm regulating ring set to the fully opened diaphragm position.

The mating coupling means in the camera for engagement with the pin 3 is disconnected from the pin 3 when the ring 2 is set to the position M for measurement under a stopped-down diaphragm setting by means (not shown). Such means may be in the form of a lever like the lever 7 which causes the engagement of the pin 3 with the mating coupling means when the ring 2 is rotated to the position A while the lever causes the pin 3 to be disconnected from the mating coupling means when the ring 2 is set to the position M.

By this arrangement, proper exposure is always obtained with either the fully opened diaphragm or the stopped-down diaphragm, because the difference in the fully opened diaphragm setting of a lens is compensated for by the variation in the quantity of light passing through the lens while the number os steps of the diaphragm regulating ring required to reduce the diaphragm opening to half of the former opening is reduced in correspondence with the reduction in the value of the fully opened diaphragm setting of the lens from the largest available fully opened diaphragm setting among the interchangeable lenses so as to compensate for the reduction in the quantity of the light passing through the lens due to the reduction in the aperture of the objective thereby permitting the proper exposure to be achieved.

I claim:

1. In a through-the-lens camera having an electronically controlled shutter in which proper exposure is determined by measuring the light from the object to be photographed, and said camera accepts interchangeable objective lenses of differing maximum apertures, a system for adjusting the exposure of said camera when said through-the-lens light measurement is made either through a fully opened or a partially stopped-down diaphragm, which comprises, in combination:

an electronically controlled shutter, including:
  a DC source; connected to said source
  an integrating circuit including:

a photoelectric element receiving through the lens of said camera the light to be measured; a capacitor in series with said photoelectric element; and, a transistor having a base connected to the juncture of said capacitor and said photoelectric element for establishing a reference time interval proportional to the intensity of the measured light by triggering thereof as determined by the voltage across said capacitor and the emitter bias applied to said capacitor, said reference time interval being used in said electronically controlled shutter to determine the proper exposure; each interchangeable lens having:

a diaphragm regulating member;
  a first coupling means mechanically interlocked with said regulating member;
  a switching member movable between either of two positions to cause said diaphragm regulating member to function in a first position as a manual diaphragm adjusting member and in a second position as a pre-set diaphragm regulating member for automatic operation; and
  a second coupling means mechanically interlocked with said mechanically interlocked with said regulating member; said camera including:

a resistor connected in parallel with said capacitor and said photoelectric element, and having a slideable contact thereon connected to said emitter to apply said emitter bias to said transistor;
  a first mating coupling means in said camera selectively engaging with the first coupling means in said lens, when said lens is mounted to said camera and connected to said slideable contact;
  a second mating coupling means in said camera selectively engaging with the second coupling means in said lens, when said lens is mounted to said camera, said first and second mating coupling means being interconnected with said switching member such that said first coupling means is coupled with said first mating coupling means when said switching member is set to one of said two positions and disengaged therefrom when said switching member is set to the other position, whereby the emitter bias is varied by said resistor in accordance with the setting of said diaphragm regulating member to achieve proper exposure when said switching member is set to said one position, and said emitter bias is held constant when said switching member is set to said other position.

2. The system according to claim 4 wherein said resistor includes a second, non-slidable contact selectively connectable to said emitter when said switching member is set to said other position; said camera further comprising:

a rotatable ring mounting thereon said resistor and coupled with said second coupling means of the lens, when said switching member is set to said one position so that said resistor is physically displaced by an amount which corresponds to the aperture of the particular lens mounted to the camera when said resistor is located at a fixed position corresponding to the aperture of the largest available lens for said camera and the switching member is set to the other position, said slidable contact being shifted to selective, predetermined positions with respect to the camera corresponding to the diaphragm settings of said lens, as set by said diaphragm adjusting member, regardless of the aperture of the lens currently mounted to said camera, whereby the emitter bias of said transistor is differentially compensated for the setting of said diaphragm regulating member and the difference in aperture of the lens currently mounted to the camera when said switching member is set to said one position.

3. The system according to claim 4 wherein said resistor is located at a fixed position in said camera; said slidable contact is located at a position which corresponds to the largest possible aperture in an interchangeable lens for said camera, regardless of the largest aperture of the lens actually mounted to said camera when said switching member is set to said one position and said diaphragm regulating member is set to its fully opened diaphragm position so as to be shifted from said position by the operation of said regulating member while said second mating coupling means in the camera is disengaged from the second coupling means in the lens when said switching member is set to the other position to locate the slidable contact at the position corresponding to the largest aperture regardless of the operation of said diaphragm regulating member.

4. In an electronically controlled shutter for a camera, of the type that includes the series connection of a light sensitive device and a capacitor for gating on a transistor to establish a reference time interval of conduction proportional to the intensity of received illumination:

means, coupled to the lens of said camera, for varying the bias of said transistor in accordance with the maximum aperture of said lens, whereby the correct duration for said reference time interval is established; and a ring extending about said lens a ring extending about said lens and operable between a first position for automatic exposure and a second position for manual exposure, said bias varying means including a resistor connected across said series connection and having first and second variable taps thereon, selectively connectable in accordance with the setting of said ring, to the emitter of said transistor.

5. The shutter according to claim 4, wherein said first variable tap is varied in accordance with the aperture of said lens, when said ring is in said manual position.

6. The shutter according to claim 4, wherein said second variable tap is varied in accordance with the maximum aperture of said lens, when said ring is in said automatic position.

* * * * *